(12) United States Patent
Baeta (10) Patent No.: US 7,395,633 B2
(45) Date of Patent: Jul. 8, 2008

(54) RAINWATER COLLECTION AND DIVERGING SYSTEM

(76) Inventor: Helio Baeta, P.O. Box 236, Marrickville, 2204 Sydney (AU)

( * ) Notice: Subject to any disclaimer, the term of this patent is extended or adjusted under 35 U.S.C. 154(b) by 309 days.

(21) Appl. No.: 11/255,829

(22) Filed: Oct. 24, 2005

(65) Prior Publication Data
US 2006/0101723 A1 May 18, 2006

(51) Int. Cl.
| | |
|---|---|
| E04D 13/00 | (2006.01) |
| G05D 11/00 | (2006.01) |
| F16K 21/18 | (2006.01) |
| F16K 31/18 | (2006.01) |
| F16K 15/00 | (2006.01) |
| F16K 17/00 | (2006.01) |
| F16K 21/04 | (2006.01) |
| F16K 31/00 | (2006.01) |
| F16L 39/00 | (2006.01) |

(52) U.S. Cl. ............. 52/16; 52/11; 52/12; 137/119.01; 137/121; 137/403; 137/448; 137/527; 251/294; 285/317; 285/318

(58) Field of Classification Search .............. 52/11, 52/12, 16, 169.5; 137/119.01, 119.6, 120–122, 137/236.1, 357, 403, 448, 527; 210/130, 210/131, 154, 161, 170.03, 172.1; 251/22, 251/66, 72, 74, 294; 285/317, 318
See application file for complete search history.

(56) References Cited

U.S. PATENT DOCUMENTS

| | | | | |
|---|---|---|---|---|
| 1,460,613 | A | | 7/1923 | Sill |
| 4,726,151 | A | * | 2/1988 | Vitale ............................ 52/16 |
| 5,234,286 | A | | 8/1993 | Wagner |
| 5,406,966 | A | * | 4/1995 | Lepkowski et al. ...... 134/104.4 |
| 5,533,303 | A | * | 7/1996 | Harvey ........................... 52/16 |
| 5,681,455 | A | * | 10/1997 | Takai et al. ................. 210/154 |
| 5,863,151 | A | * | 1/1999 | Chapotelle ................... 405/52 |
| 6,148,852 | A | * | 11/2000 | Osterman .................... 137/391 |
| D444,079 | S | | 6/2001 | Addink et al. |
| 6,446,665 | B2 | * | 9/2002 | Coscarella .................. 137/420 |
| 6,526,699 | B1 | | 3/2003 | Foglio, Sr. |
| 6,619,312 | B2 | | 9/2003 | Doiron |
| 2004/0031209 | A1 | * | 2/2004 | Porter ........................... 52/12 |
| 2004/0040598 | A1 | | 3/2004 | Zimmerman, Jr. et al. |

FOREIGN PATENT DOCUMENTS

AU 199645509 2/1995

(Continued)

Primary Examiner—Richard E. Chilcot
Assistant Examiner—Branon C Painter (57) ABSTRACT

A rainwater collection and diverging system includes a housing that has a bottom wall and a perimeter wall. A door is positioned in the bottom wall. A hinge hingedly couples the door to the bottom wall and a biasing member is attached to the door and biases the door in a closed position. Fluid in the housing may flow outwardly through the bottom wall when a biasing action of the biasing member is overcome and the door is moved to an open position. An outlet is fluidly coupled to the housing. A downspout has a bottom end extending into the housing. A conduit is fluidly coupled to and extends between a free end of the outlet and a fluid receptacle. Water flowing down the downspout is directed into the conduit until a force of the water flowing down the downspout overcomes the biasing action and opens the door.

11 Claims, 6 Drawing Sheets

FOREIGN PATENT DOCUMENTS

| AU | 199665759 | 9/1995 |
| AU | 199928085 | 5/1999 |
| AU | 200053730 | 6/2000 |
| AU | 2004200609 | 2/2004 |
| AU | 2004100197 | 3/2004 |

* cited by examiner

RAINWATER COLLECTION AND DIVERGING SYSTEM

BACKGROUND OF THE INVENTION

1. Field of the Invention

The present invention relates to water collection devices and more particularly pertains to a new water collection device for diverting water into a holding tank without risk of water backing up a dwelling's downspout.

2. Description of the Prior Art

The use of water collection devices is known in the prior art. U.S. Pat. No. 6,619,312 includes a flow controlling mechanism for allowing only partial flow of rainwater from a downspout to enter a storage container and which also includes a means for filtering the rain water. Another type of water collection device is U.S. Pat. No. 1,460,613 having a tank assembly connected to a rain gutter of a dwelling for capturing and storing rainwater caught in the rain gutter. Still another such device is found in U.S. patent application No. 2004/0040598 and includes a system for recovering rainwater for later consumption. Yet another water collection device is found in U.S. Pat. No. 5,234,286 having an underground reservoir tank.

While these devices fulfill their respective, particular objectives and requirements, the need remains for a system that may be integrated into a dwelling's rain gutter assembly without disrupting the effectiveness and usage of the rain gutter assembly. In particular, the system should be configured to store rainwater for irrigation and other uses while ensuring that the rain gutter assembly does not overflow or become backed up in the process.

SUMMARY OF THE INVENTION

The present invention meets the needs presented above by generally comprising a housing that has a bottom wall and a perimeter wall that is attached to and extends upwardly from the bottom wall. The perimeter wall has an upper edge defining an opening configured to receive and fluidly couple to a downspout. A door is positioned in the bottom wall. A hinge hingedly couples the door to the bottom wall and a biasing member is attached to the door and biases the door in a closed position. The door extends downwardly away from the bottom wall when the door is in an open position. Fluid in the housing may flow outwardly through the bottom wall when a biasing action of the biasing member is overcome and the door is moved to the open position. An outlet is fluidly coupled to the housing and extends outwardly therefrom. A downspout has a bottom end extending into the opening. A conduit is fluidly coupled to and extends between a free end of the outlet and a fluid receptacle. Water flowing down the downspout is directed into the conduit until a force of the water flowing down the downspout overcomes the biasing action and opens the door.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 8 thereof, a new water collection device embodying the principles and concepts of the present invention and generally designated by the reference numeral 10 will be described.

Figure 1:
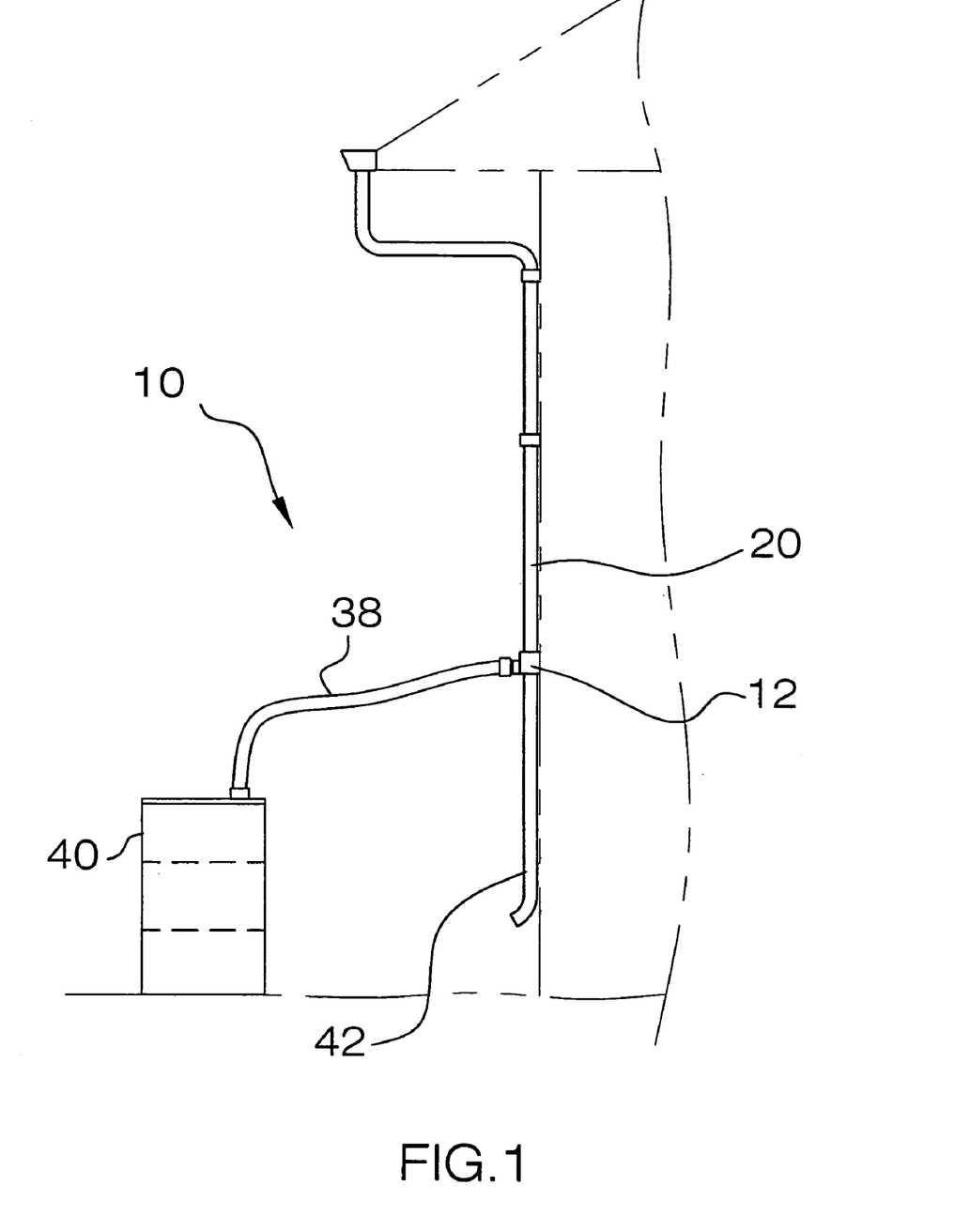
FIG. 1 is a side in-use view of a rainwater collection and diverging system according to the present invention.
Figure 2:
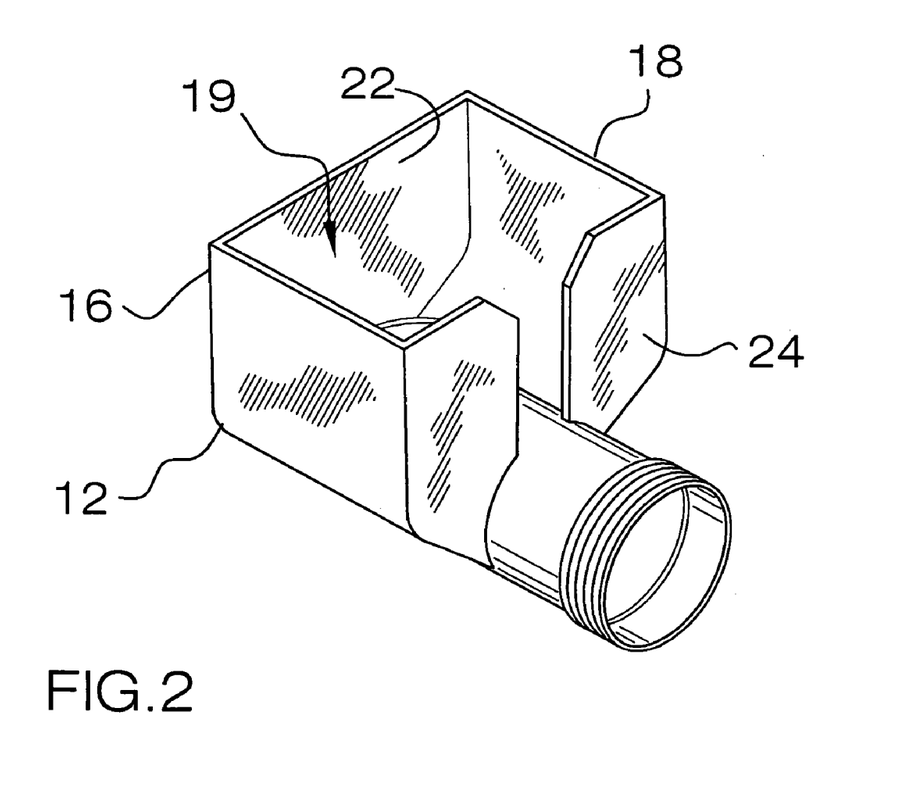
FIG. 2 is a perspective view of a housing of the present invention.
Figure 3:
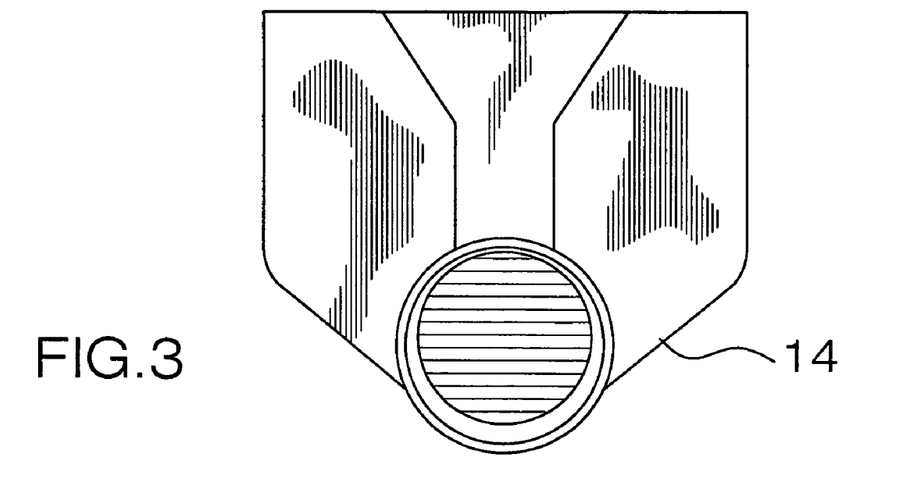
FIG. 3 is a bottom view of the housing present invention.
Figure 4:
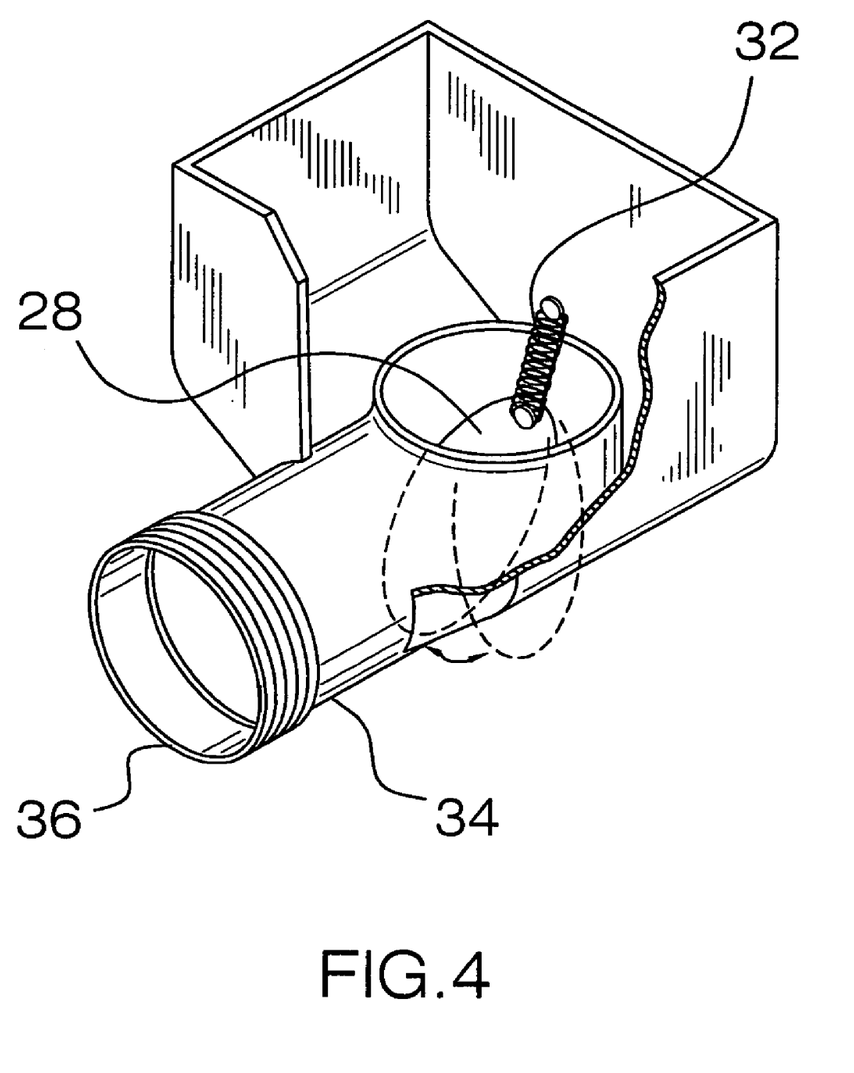
FIG. 4 is a perspective broken view of the housing of the present invention.
Figure 5:
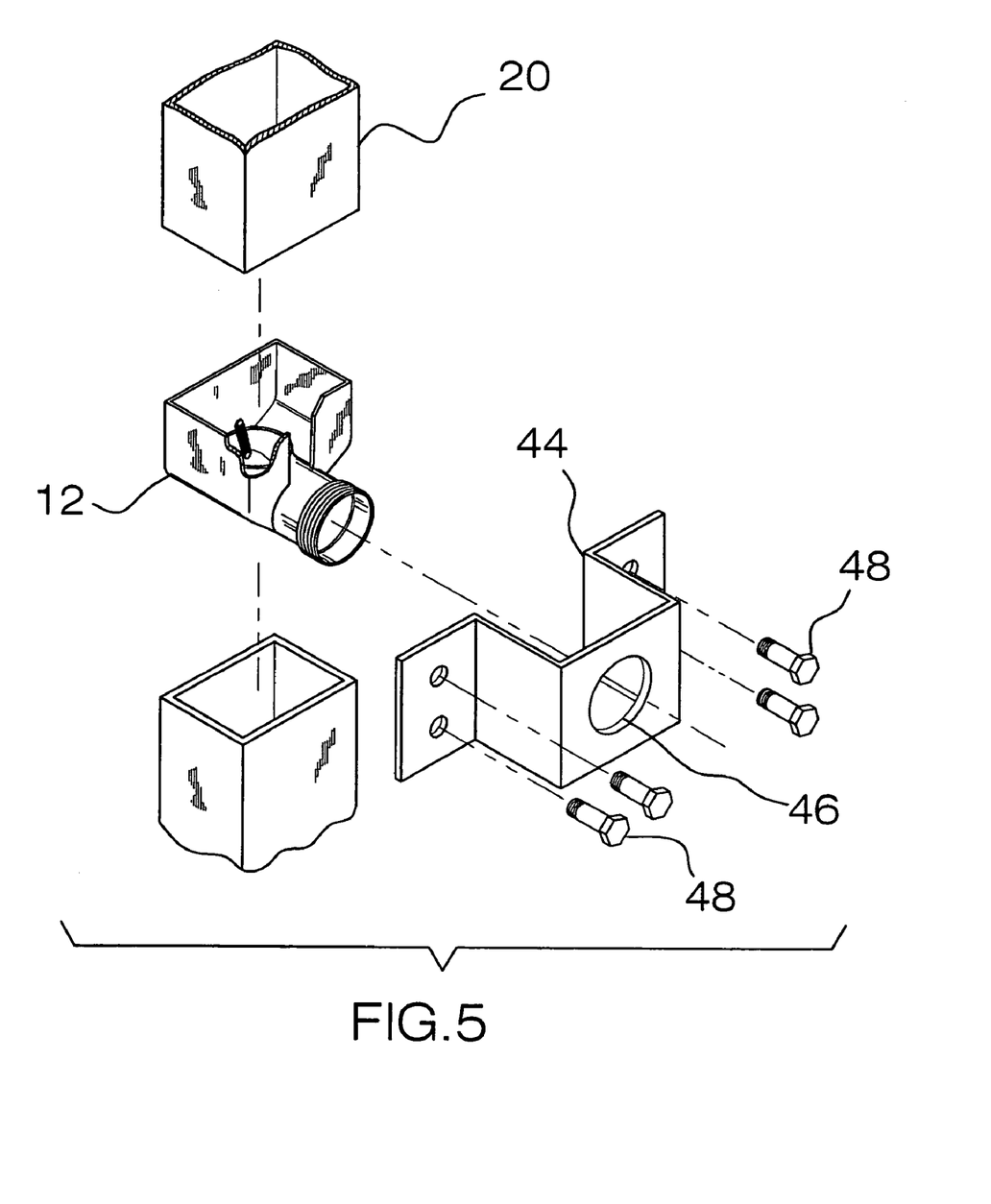
FIG. 5 is a perspective view of the present invention.
Figure 6:
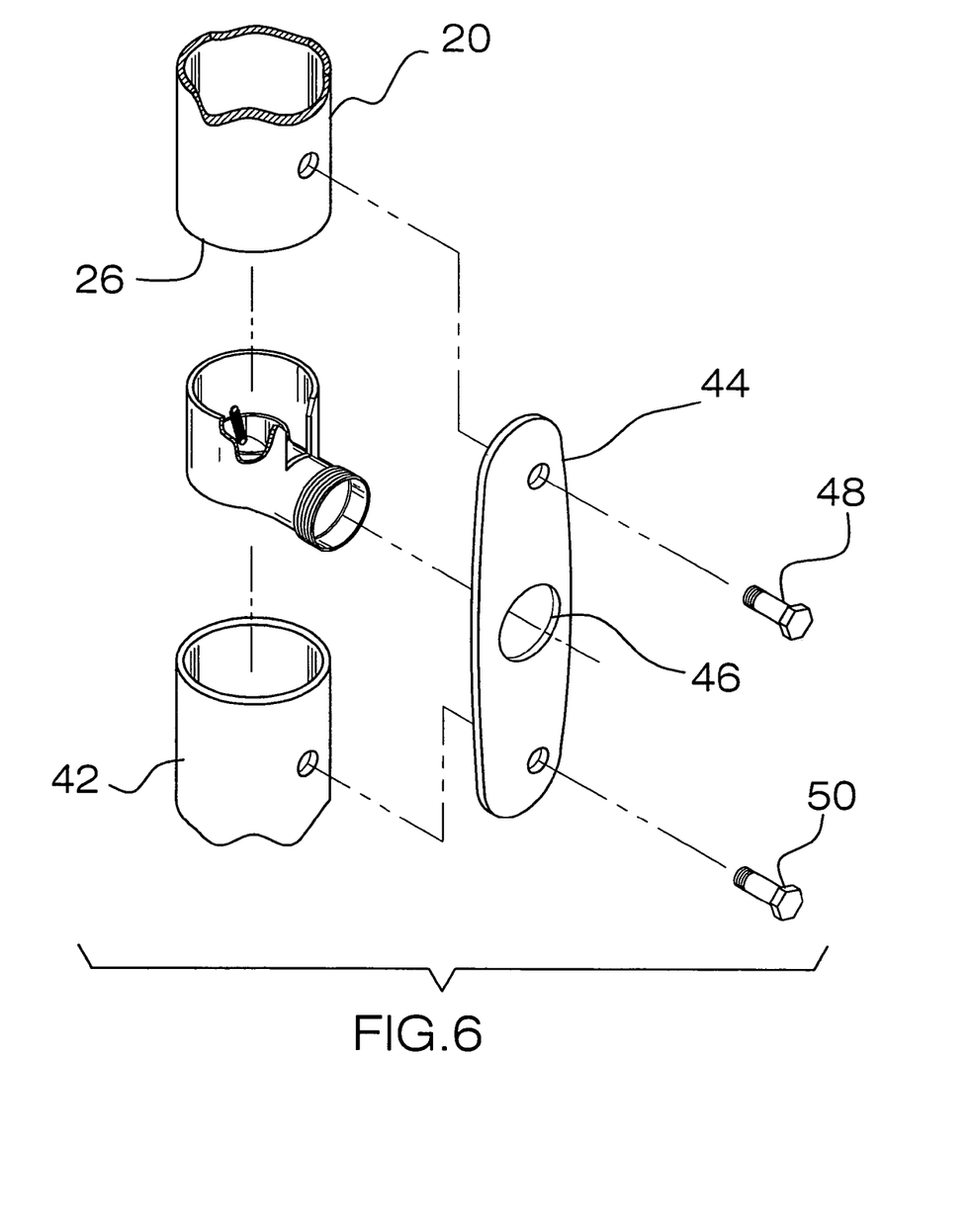
FIG. 6 is a perspective view of a second embodiment of the present invention.
Figure 7:
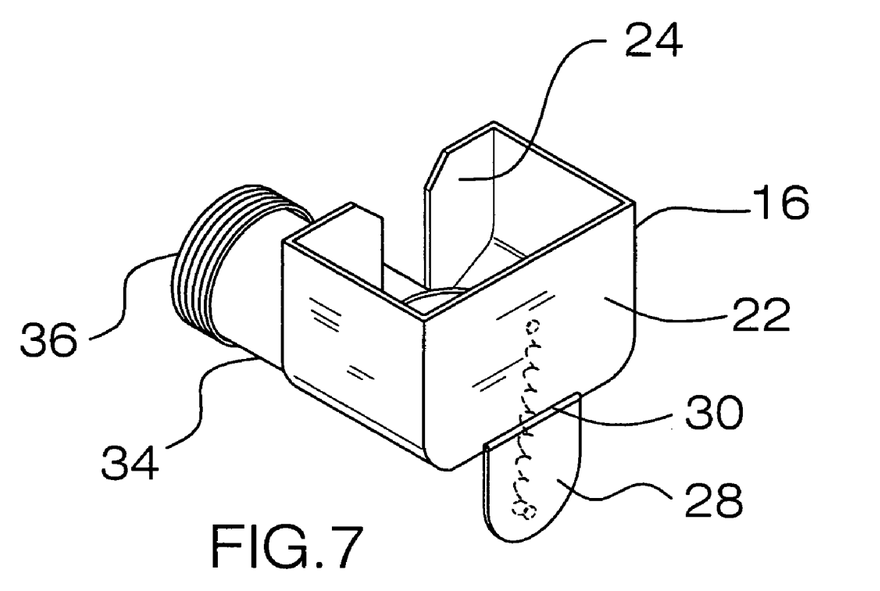
FIG. 7 is a rear perspective view of the housing of the present invention.
Figure 8:
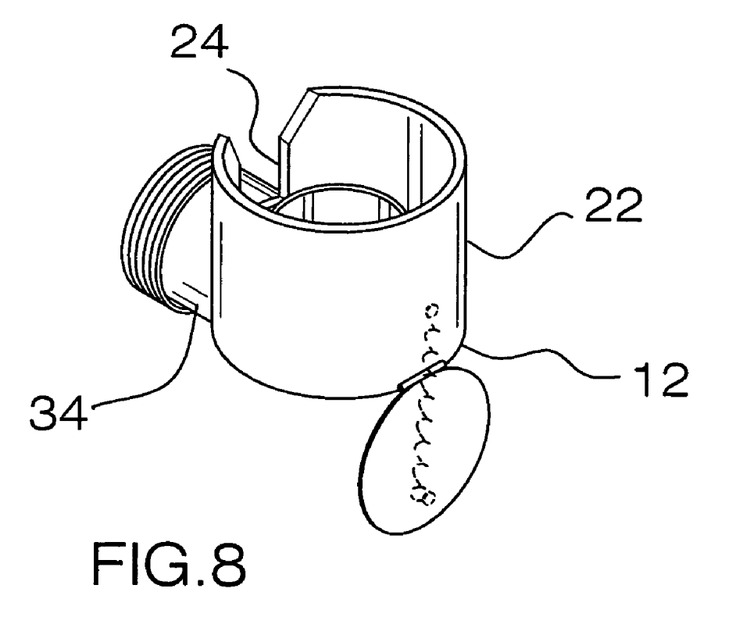
FIG. 8 is a rear perspective view of the housing of the second embodiment of the present invention.

As best illustrated in FIGS. 1 through 8, the rainwater collection and diverging system 10 generally comprises a housing 12 that has a bottom wall 14 and a perimeter wall 16 that is attached to and extends upwardly from the bottom wall 14. The perimeter wall 16 has an upper edge 18 defining an opening 19 configured to receive and be fluidly coupled to a downspout 20. The perimeter wall 16 includes a rear wall 22 and a forward wall 24 that are positioned generally opposite with respect to each other. The downspout 20 has a bottom end 26 extending into the opening 19. FIGS. 6 and 8 shows a second embodiment of the housing 12 wherein the perimeter wall has a circular shape. The housing 12 of this embodiment is still includes a forward wall 24 and a rear wall 22.

A door 28 is positioned in the bottom wall 14. A hinge 30 hingedly couples the door 28 to the bottom wall 14. A biasing member 32 is attached to the door 28 and biases the door 28 in a closed position. The door 28 extends downwardly away from the bottom wall 14 when the door 28 is in an open position. Fluid in the housing 12 may flow outwardly through the bottom wall 14 when a biasing action of the biasing member 32 is overcome and the door 28 is moved to the open position. This may happen when water backs up into the downspout 20 or the force of the water flowing downwardly through the downspout 20 is particularly forceful such as during a downpour. The hinge 30 is positioned adjacent to the rear wall 22. The door 28 is angled downwardly from the rear wall 22 toward the forward wall 24 when the door 28 is in the closed position. The biasing member 32 comprises a spring having a first end attached to an inner surface of the rear wall and a second end attached to a top surface of the door 28.

An outlet 34 is fluidly coupled to the housing 12 and extends outwardly therefrom. The outlet 34 extends through the forward wall 24 and has a free end 36 positioned distal to the housing 12. This positioning causes the angled door 28 to direct the water from the downspout 20 toward the outlet 34. The outlet is threaded adjacent to the free end 36.

A conduit 38 is fluidly coupled to and extends between the free end 36 of the outlet 34 and a fluid receptacle 40. The fluid receptacle may include any conventional container configured for holding and storing water. Water flowing down the downspout is directed into the conduit until a force of the water flowing down the downspout overcomes the biasing action and opens the door. The strength of the spring will depend on the size of the diameter of the downspout as well as the size of conduit and the water flow volume capabilities of the conduit.

A drainpipe 42 is in fluid communication with the housing 12 and extends downwardly from the bottom wall 14. Water flows through the bottom wall 14 when the door 28 is in the open position and is directed into the drainpipe 42.

A coupler configured to releasably secure the downspout 20 to the housing 12 may be used. The coupler preferably includes a bracket 44 having an aperture 46 therein through which the outlet 34 may be extended. Fasteners 48 are extended through the bracket 44 and into either downspout 20 or into a dwelling wall positioned adjacent to the downspout 20. FIGS. 5 and 6 show two different couplers. The coupler in FIG. 6 further includes a fastener 50 that may be extended through the bracket 44 and into the drainpipe 42 to secure the drainpipe 42 to the housing 12.

In use, the housing 12 is connected to the downspout 20 of a dwelling and then fluidly coupled to a water receptacle via the conduit 38. The water held in the receptacle 40 may then be used as fresh water for any number of uses. The door 28 prevents an overflow in the drainpipe 42 if too much water is forced through the conduit 38 and allows the excess water to be drained downwardly in to the drainpipe 42 where it can be carried away from a base of the dwelling.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rainwater diverging system comprising:
a housing having a bottom wall and a perimeter wall being attached to and extending upwardly from said bottom wall, said perimeter wall having an upper edge defining an opening configured to receive and fluidly couple to a downspout;
a door being positioned in said bottom wall, a hinge coupling said door to said bottom wall, a biasing member being attached to said door and biasing said door in a closed position, said door extending downwardly away from said bottom wall when said door is in an open position, wherein fluid in said housing may flow outwardly through said bottom wall when a biasing action of said biasing member is overcome and said door is moved to said open position, said perimeter wall including a rear wall and a forward wall being positioned generally opposite with respect to each other, said hinge being positioned adjacent to said rear wall and said outlet extending outwardly of said forward wall, said door being angled downwardly from said rear wall toward said forward wall when said door is in said closed position, said biasing member comprising a spring having a first end attached to an inner surface of said rear wall and a second end attached to a top surface of said door;
an outlet being fluidly coupled to said housing and extending outwardly therefrom;
a downspout having a bottom end extending into said opening;
a conduit being fluidly coupled to and extending between a free end of said outlet and a fluid receptacle, wherein water flowing down said downspout is directed into said conduit until a force of the water flowing down said downspout overcomes said biasing action and opens said door.

2. The system according to claim 1, wherein said outlet is threaded adjacent to said free end, said conduit being threadably coupled to said outlet.

3. The system according to claim 1, further including a drainpipe being in fluid communication with said housing and extending downwardly from said bottom wall, wherein water flowing through said bottom wall when said door is in said open position is directed into said drainpipe.

4. The system according to claim 1, further including a coupler being configured to releasably secure said downspout to said housing.

5. A rainwater diverging system comprising:
a housing having a bottom wall and a perimeter wall being attached to and extending upwardly from said bottom wall, said perimeter wall having an upper edge defining an opening configured to receive and fluidly couple to a downspout, said perimeter wall including a rear wall and a forward wall being positioned generally opposite with respect to each other,
a door being positioned in said bottom wall, a hinge coupling said door to said bottom wall, a biasing member being attached to said door and biasing said door in a closed position, said door extending downwardly away from said bottom wall when said door is in an open position, wherein fluid in said housing may flow outwardly through said bottom wall when a biasing action of said biasing member is overcome and said door is moved to said open position, said hinge being positioned adjacent to said rear wall, said door being angled downwardly from said rear wall toward said forward wall when said door is in said closed position, said biasing member comprising a spring having a first end attached to an inner surface of said rear wall and a second end attached to a top surface of said door;

an outlet being fluidly coupled to said housing and extending outwardly therefrom, said outlet extending through said forward wall, said outlet having a free end positioned distal to said housing, said outlet being threaded adjacent to said free end;

a downspout having a bottom end extending into said opening;

a conduit being fluidly coupled to and extending between said free end of said outlet and a fluid receptacle, wherein water flowing down said downspout is directed into said conduit until a force of the water flowing down said downspout overcomes said biasing action and opens said door;

a drainpipe being in fluid communication with said housing and extending downwardly from said bottom wall, wherein water flowing through said bottom wall when said door is in said open position is directed into said drainpipe; and a coupler being configured to releasably secure said downspout to said housing.

6. A rainwater diverging system comprising:

a housing having a bottom wall and a perimeter wall being attached to and extending upwardly from said bottom wall, said perimeter wall having an upper edge defining an opening configured to receive and fluidly couple to a downspout;

a door being positioned in said bottom wall, a hinge coupling said door to said bottom wall, a biasing member being attached to said door and biasing said door in a closed position, said door extending downwardly away from said bottom wall when said door is in an open position, wherein fluid in said housing may flow outwardly through said bottom wall when a biasing action of said biasing member is overcome and said door is moved to said open position, said biasing member comprising a spring having a first end attached to an inner surface of said perimeter wall and a second end attached to a top surface of said door;

an outlet being fluidly coupled to said housing and extending outwardly therefrom;

a downspout having a bottom end extending into said opening;

a conduit being fluidly coupled to and extending between a free end of said outlet and a fluid receptacle, wherein water flowing down said downspout is directed into said conduit until a force of the water flowing down said downspout overcomes said biasing action and opens said door.

7. The system according to claim 6, wherein said perimeter wall includes a rear wall and a forward wall being positioned generally opposite with respect to each other, said hinge being positioned adjacent to said rear wall and said outlet extending outwardly of said forward wall.

8. The system according to claim 7, wherein said door is angled downwardly from said rear wall toward said forward wall when said door is in said closed position.

9. The system according to claim 6, wherein said outlet is threaded adjacent to said free end, said conduit being threadably coupled to said outlet.

10. The system according to claim 6, further including a drainpipe being in fluid communication with said housing and extending downwardly from said bottom wall, wherein water flowing through said bottom wall when said door is in said open position is directed into said drainpipe.

11. The system according to claim 6, further including a coupler being configured to releasably secure said downspout to said housing.

* * * * *